No. 829,358. PATENTED AUG. 21, 1906.
C. R. WEIDMÜLLER.
SOCKET MEMBER OF GLOVE BUTTONS.
APPLICATION FILED FEB. 11, 1905.

UNITED STATES PATENT OFFICE.

CARL ROBERT WEIDMÜLLER, OF CHEMNITZ, GERMANY.

SOCKET MEMBER OF GLOVE-BUTTONS.

No. 829,358.  Specification of Letters Patent.  Patented Aug. 21, 1906.

Application filed February 11, 1905. Serial No. 245,233.

*To all whom it may concern:*

Be it known that I, CARL ROBERT WEIDMÜLLER, a subject of the King of Saxony and the Emperor of Germany, and a resident of the city of Chemnitz, Saxony, in the German Empire, have invented certain new and useful Improvements in the Socket Member of Glove-Buttons, of which the following is a full, clear, and exact specification.

It is desirable that the outer surface of a glove-button be decorated or that it be made of a material like mother-of-pearl, nut, horn, wood, glass, porcelain, celluloid, pâpier-maché, and similar material.

The present invention has for its object to provide a socket member of a glove-button of the desirable decorative material, presenting a space for the resilient stud member, which space is entirely lined with metal and offers an absolutely smooth surface throughout, having a contracted opening and being suitably widened to receive and retain the resilient head of the stud member.

Figure 1:
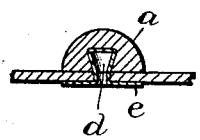
Figure 2:
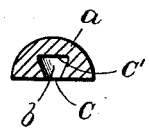

In the accompanying drawings, illustrating my invention and forming part of this specification, Figure 1 shows my socket member secured to the fabric in cross-section. Fig. 2 is a cross-section through the top part made of pearl, horn, &c., and Fig. 3 is a cross-section through the flanged sleeve before its insertion into the part, Fig. 2.

The top part $a$, which is preferably made of the above-named materials, plain or decorated, but which may be also made of metal, is provided with a chamber or cavity $b$, the opening $c$ of which has a much smaller diameter than the inner space. Preferably the depression or cavity is gradually flaring inwardly, so as to present the surface of a truncated cone or conical side walls of a frusto-conical shape and so that the deepest part is the widest. The bottom or crown wall $c'$ is made approximately flat or plane.

Figure 3:
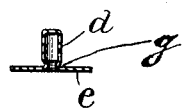

The flanged part $d$, Fig. 3, is not an open sleeve, as used heretofore, but is closed on the top, forming a cap which is at the base—that is, near the plate $e$—slightly contracted or grooved at $g$. The largest outer diameter of the sleeve or cap $d$ is a small trifle more than the diameter of the opening $c$, so that the insertion of the sleeve $d$ into the cavity $b$ can be effected only by force. In uniting the two parts the cap $d$ is first pushed through a hole in the fabric and is then forced into the the cavity $b$ of the top part, Fig. 2. When the closed end of the sleeve $d$ strikes the bottom $c'$, it is flattened and the metal of the cap is widened out and smoothly fitted against the sides of the cavity. It is to be noted that the cap is expanded radially into the cavity to closely line the walls thereof, and said cap is provided at its base with a groove $g$ to interlock with the edge of the wall at the entrance. To this end special machinery and tools are employed which will not be described here, as they do not form part of this invention.

It is evident that the inner surface of the cavity of the socket member as described is absolutely smooth and is adapted to receive the stud member of the glove-fastener without obstruction.

Having thus described my invention, what I claim is—

1. A button comprising a body having a cavity provided with a contracted entrance thereto, said cavity having a substantially plane crown-wall and conical side walls forming a cavity of approximately frusto-conical shape and having continuous smooth-surfaced walls in combination, with a socket member composed of a flange-plate and a hollow cap, the largest outer diameter of said cap being slightly larger than the diameter of the opening to said cavity and radially expanded into said cavity in intimate contact with the walls thereof, said cap forming a lining, reinforcing and bracing the walls of the cavity, and covering the side and bottom walls thereof, and a smooth-surfaced socket for the reception of the resilient head of a stud member, substantially as described.

2. A button comprising a body having a frusto-conical cavity provided with a contracted entrance, in combination with a socket member, composed of a flange-plate and a hollow cap with conical side walls and with its largest outer diameter slightly greater than the diameter of the opening to said cavity, extending into the cavity through said entrance, said cap being radially expanded into the cavity to closely line the walls thereof, and provided at its base with a groove and interlocked with the edge of the wall at the entrance, substantially as described.

3. A button attached to material comprising a body having a frusto-conical cavity with plane crown-wall and conical side walls with a contracted entrance, and a flanged part having a cap closed at its end with an annular contraction at its junction with the flange, said cap being of slightly greater diameter than the diameter of the entrance to said cavity and passed through the material to which the button is attached and entered in said cavity and the closed cap portion spread radially to snugly fit and engage the said plane crown and side walls of the cavity, said contracted portion being interlocked with the edge wall of the entrance to the cavity, and the cap forming a smooth-lined surface to the cavity to receive the stud member, as and for the purpose specified.

In testimony whereof I affix my signature.

CARL ROBERT WEIDMÜLLER.

In presence of—
   FRIEDR. ED. SCHÄFER,
   FREDERICK J. DIETZMAN.